United States Patent
Chiu (10) Patent No.: US 9,006,916 B2
(45) Date of Patent: Apr. 14, 2015

(54) PRESSURE-TO-ROTATION CONVERTER AND PRESSURE-TO-ELECTRIC CONVERTING SYSTEM

(71) Applicant: Jun Fu Clean Energy Co., Ltd., Changhua County (TW)

(72) Inventor: Ming-Chin Chiu, Changhua County (TW)

(73) Assignee: Jun Fu Clean Energy Co., Ltd., Changhua County (TW)

( * ) Notice: Subject to any disclaimer, the term of this patent is extended or adjusted under 35 U.S.C. 154(b) by 0 days.

(21) Appl. No.: 14/096,972

(22) Filed: Dec. 4, 2013

(65) Prior Publication Data

US 2014/0339833 A1 Nov. 20, 2014

(30) Foreign Application Priority Data

May 14, 2013 (TW) .............................. 102117021 A (51) Int. Cl.
*F03G 7/08* (2006.01)
*F16H 21/16* (2006.01)
*H02K 7/18* (2006.01)

(52) U.S. Cl.
CPC *F16H 21/16* (2013.01); *F03G 7/08* (2013.01); *H02K 7/1853* (2013.01)

(58) Field of Classification Search
CPC .......... F16H 21/16; F03G 7/08; H02K 7/1853
USPC .................................................. 290/1 C, 1 R
See application file for complete search history.

(56) References Cited

U.S. PATENT DOCUMENTS

| | | | | |
|---|---|---|---|---|
| 1,916,873 A * | 7/1933 | Wiggins | ........................ | 185/39 |
| 3,859,589 A * | 1/1975 | Rush | ............................... | 322/40 |
| 3,885,163 A * | 5/1975 | Toberman | .................... | 290/1 R |
| 4,238,687 A * | 12/1980 | Martinez | ...................... | 290/1 R |
| 4,239,974 A * | 12/1980 | Swander et al. | .............. | 290/1 R |
| 4,250,395 A * | 2/1981 | Lundgren | .................... | 290/1 R |
| 4,434,374 A * | 2/1984 | Lundgren | .................... | 290/1 R |
| 4,980,572 A * | 12/1990 | Sen | ............................... | 290/1 R |
| 6,091,159 A * | 7/2000 | Galich | ......................... | 290/1 R |
| 6,204,568 B1 * | 3/2001 | Runner | ........................ | 290/1 R |
| 7,102,244 B2 * | 9/2006 | Hunter, Jr. | .................... | 290/1 R |
| 7,629,698 B2 * | 12/2009 | Horianopoulos et al. | ..... | 290/1 R |
| 7,714,456 B1 * | 5/2010 | Daya | ............................. | 290/1 R |
| 2004/0160058 A1 * | 8/2004 | Gott et al. | ..................... | 290/1 R |
| 2007/0264081 A1 * | 11/2007 | Chiu | .............................. | 404/71 |
| 2008/0224477 A1 * | 9/2008 | Kenney | ........................ | 290/1 R |
| 2009/0243304 A1 * | 10/2009 | Stein | ............................. | 290/1 C |
| 2010/0072758 A1 * | 3/2010 | Chang et al. | .................. | 290/1 R |
| 2011/0215589 A1 * | 9/2011 | Chen | ............................. | 290/1 C |
| 2012/0068473 A1 * | 3/2012 | Gohmann | ..................... | 290/1 C |
| 2012/0211996 A1 * | 8/2012 | Jang | ............................. | 290/1 R |

(Continued)

*Primary Examiner* — Tulsidas C Patel
*Assistant Examiner* — Viet Nguyen
(74) *Attorney, Agent, or Firm* — Osha Liang LLP (57) ABSTRACT

A pressure-to-rotation converter includes a securing device, an actuating device, a transmission device, and a drive device. The securing device includes a bottom plate formed with a guide groove unit, and a top plate formed with a hole unit registered with the guide groove unit. The actuating device includes a follower unit movably received in the guide groove unit and an actuating unit movably received in the hole unit for driving movement of the follower unit to drive in turn movement of the transmission device. The drive device includes a swing unit coupled to a rotary drive shaft and driven by the transmission device to swing and thereby rotate the rotary drive shaft.

14 Claims, 7 Drawing Sheets

(56) References Cited

U.S. PATENT DOCUMENTS

| | | |
|---|---|---|
| 2012/0248788 A1* | 10/2012 | Pirisi .......................... 290/1 R |
| 2013/0009407 A1* | 1/2013 | Chiu ........................... 290/1 C |
| 2013/0127176 A1* | 5/2013 | Alqanee ...................... 290/1 C |
| 2013/0193692 A1* | 8/2013 | Dmitriev ..................... 290/1 R |

* cited by examiner

PRESSURE-TO-ROTATION CONVERTER AND PRESSURE-TO-ELECTRIC CONVERTING SYSTEM

CROSS-REFERENCE TO RELATED APPLICATION

This application claims priority of Taiwanese Application No. 102117021, filed on May 14, 2013.

BACKGROUND OF THE INVENTION

1. Field of the Invention

The invention relates to a converter, more particularly to a pressure-to-rotation converter. This invention also relates to a pressure-to-electric converting system including the pressure-to-rotation converter.

2. Description of the Related Art

Due to a massive number of vehicles used in the modern society, especially in metropolitan areas, generating energy from moving vehicles would be deemed helpful against the energy crisis. Several conventional energy-generating devices are available to the public for converting intermittent pressure into electrical charges. However, these conventional energy-generating devices have several disadvantages. For example, installation cost of the conventional energy-converting devices is relatively high since they need to be embedded under a ground surface and thus require road digging and reconstruction. Moreover, the conventional energy-converting devices usually generate electricity via piezoelectric materials, which have relatively low electricity-generating efficiency.

SUMMARY OF THE INVENTION

Therefore, the object of the present invention is to provide a pressure-to-rotation converter that can directly mounted on the road surface and alleviate the aforementioned drawbacks of the prior art.

According to one aspect of the present invention, a pressure-to-rotation converter comprises a securing device, an actuating device, a transmission device, and a drive device.

The securing device includes a bottom plate and a top plate. The bottom plate has a top surface that is formed with a guide groove unit, and the top plate is disposed on top of the bottom plate and is formed with a hole unit that is registered with the guide groove unit. The top plate and the bottom plate cooperatively define a slide groove unit which extends in a longitudinal direction and which is in spatial communication with the guide groove unit.

The actuating device includes a follower unit and an actuator unit. The follower unit is received in the guide groove unit and is movable in the longitudinal direction between an initial position and an actuated position. The actuator unit is disposed in the hole unit and is movable between an upper non-pressed position, where the actuator unit protrudes from a top surface of the top plate, and a lower pressed position, where the actuator unit is pressed downward and drives movement of the follower unit from the initial position to the actuated position.

The transmission device is received in the slide groove unit and has a force-transmitting end portion that extends outwardly of the securing device. The transmission device is driven by the follower unit to move along the slide groove unit to a driving state, where the force-transmitting end portion is further extended outward of the securing device, when the follower unit moves from the initial position to the actuated position. The drive device is disposed outwardly of the securing device and includes a rotary drive shaft and a swing unit. The swing unit has a first end portion coupled to the rotary drive shaft via a unidirectional bearing unit, and a second end portion driven by the force-transmitting end portion of the transmission device to urge the swing unit to swing and thereby rotate the rotary drive shaft in a rotating direction when the transmission device is driven by the follower unit to the driving state.

According to another aspect of the present invention, a pressure-to-electric converting system comprises the aforementioned pressure-to-rotation converter and an electrical generator coupled to the rotary drive shaft of the drive device of the pressure-to-rotation converter and operable to convert rotation of the rotary drive shaft into electricity.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Referring to FIGS. 1 to 9, the preferred embodiment of the pressure-to-electric converting system according to the present invention is shown to include a pressure-to-rotation converter 10, a speed-increasing gear set 5, an electric generator 6, and an electricity storage device 7.

Figure 1:
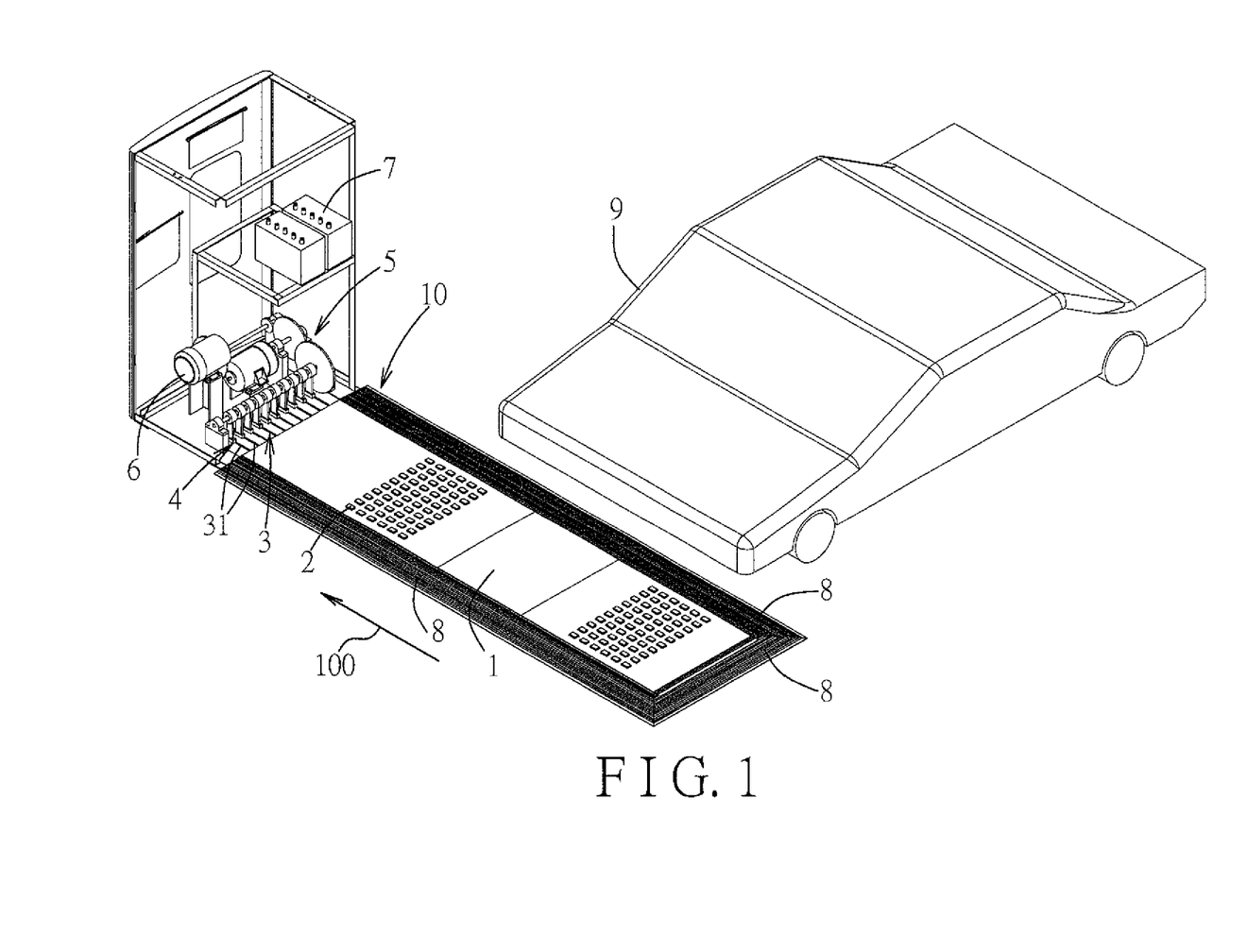
FIG. 1 is a perspective view showing a preferred embodiment of a pressure-to-electric converting system according to the invention.
Figure 2:
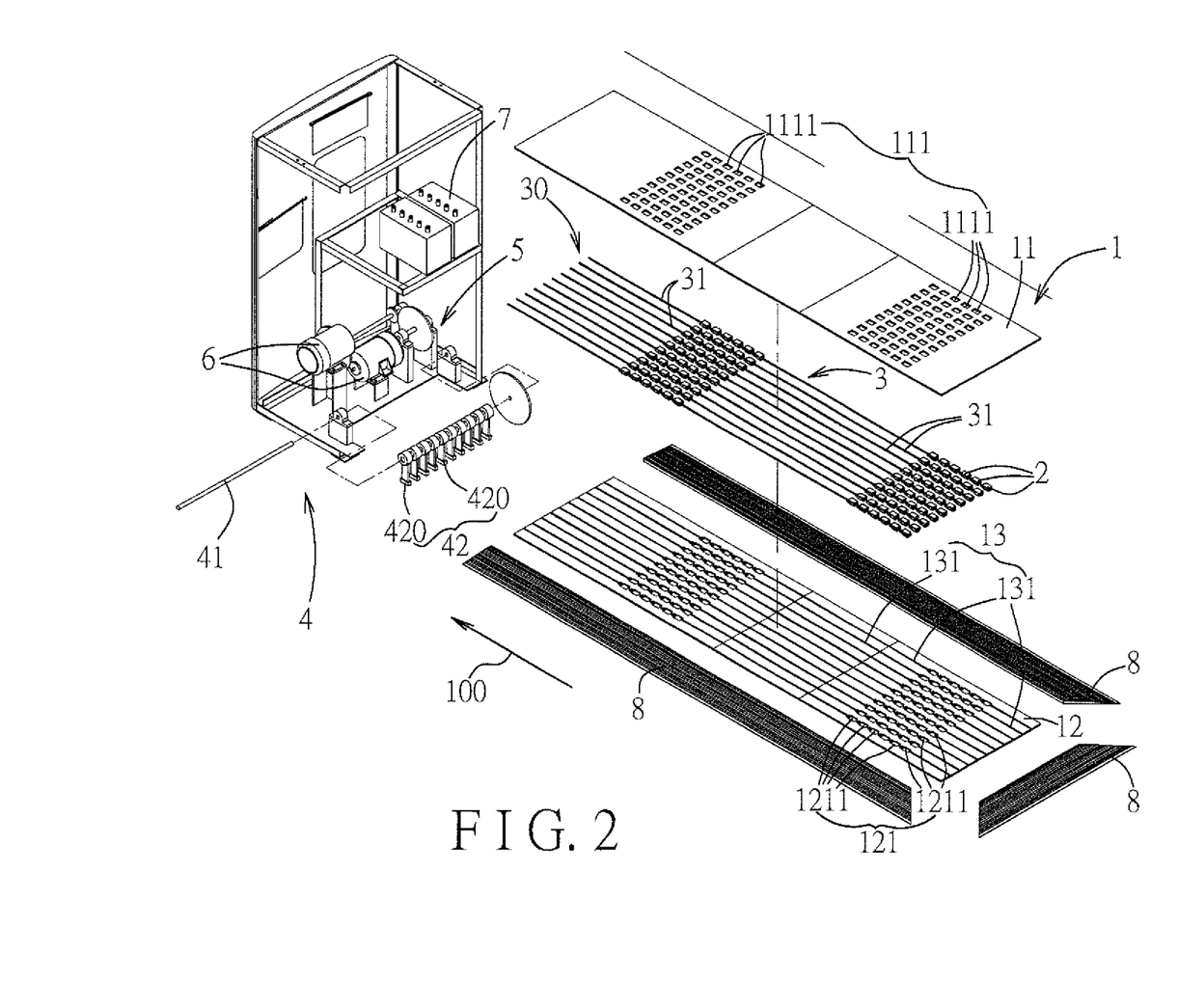
FIG. 2 is an exploded perspective view of the preferred embodiment.
Figure 3:
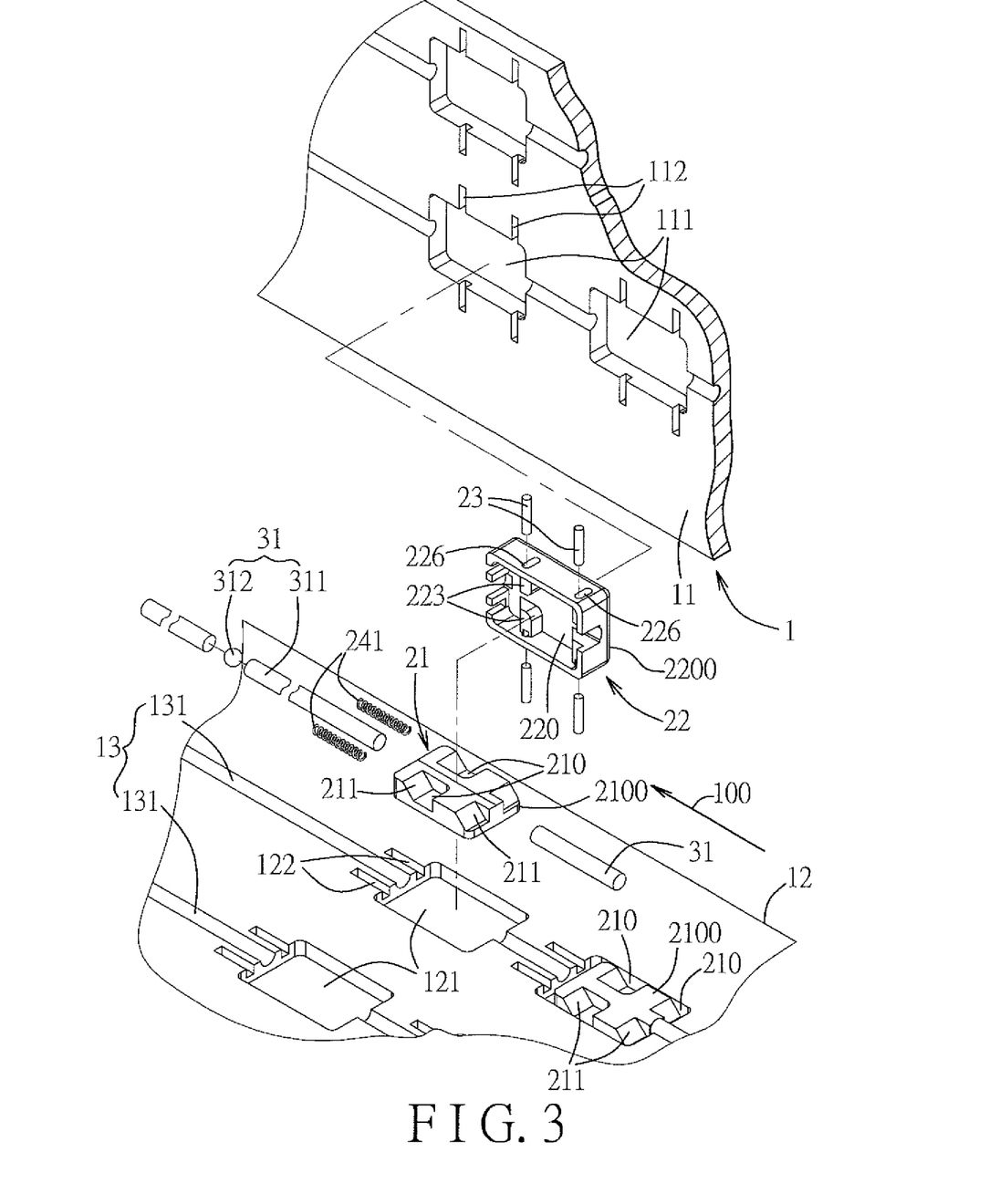
FIG. 3 is a partly exploded view showing a pressure-to-rotation converter of the preferred embodiment.
Figure 4:
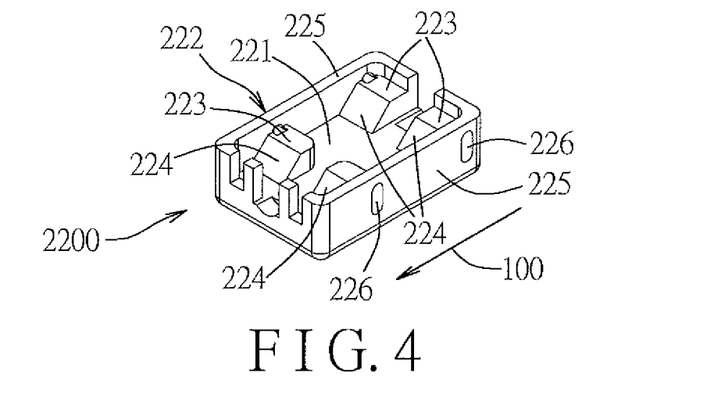
FIG. 4 is a perspective view showing an actuator component of the preferred embodiment.
Figure 5:
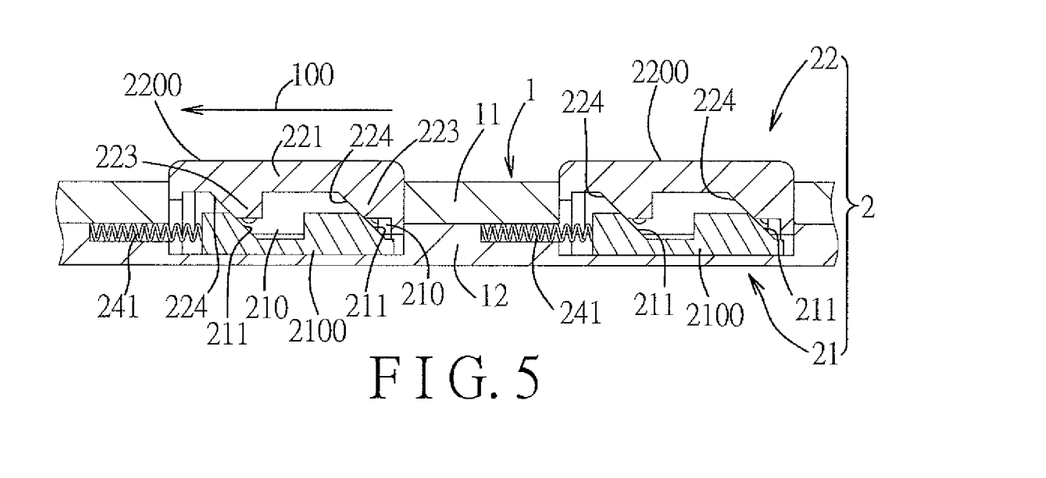
FIG. 5 is a fragmentary sectional view showing an actuating device including a pair of the actuator components in an upper non-pressed position and a pair of follower components in an initial position.
Figure 6:
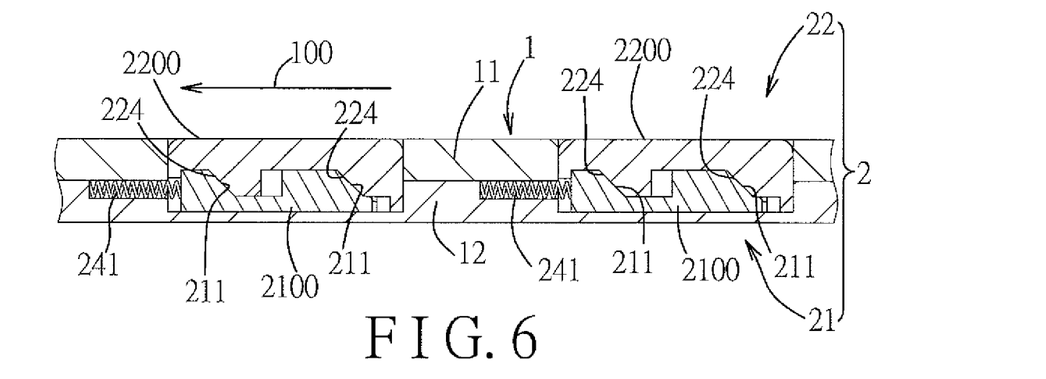
FIG. 6 is a fragmentary sectional view of the preferred embodiment showing the actuator components in a lower pressed position and the follower components in an actuated position.

As shown in FIGS. 2 and 3, the pressure-to-rotation converter 10 includes a securing device 1, an actuating device 2, a transmission device 3, and a drive device 4.

The securing device 1 has first and second ends opposite to each other in a longitudinal direction 100, and includes a bottom plate 12 and a top plate 11. The bottom plate 12 has a top surface that is formed with a guide groove unit 121, and the top plate 11 is disposed on top of the bottom plate 12 and is formed with a hole unit 111 that is registered with the guide groove unit 121. The top plate 11 and the bottom plate 12 cooperatively define a slide groove unit 13 which extends in the longitudinal direction 100 and which is in spatial communication with the guide groove unit 121. In this embodiment, the guide groove unit 121 includes a plurality of spaced-apart guide grooves 1211 arranged in the longitudinal direction 100 and in multiple rows (i.e., in a two-dimensional array), the hole unit 111 includes a plurality of holes 1111 registered respectively with the guide grooves 1211, and the sliding groove unit 13 includes a plurality of rows of spaced-apart slide grooves 131 in spatial communication with a respective row of the guide grooves 1211.

As shown in FIGS. 3 to 6, the actuating device 2 includes a follower unit 21 and an actuator unit 22. The follower unit 21 is received in the guide groove unit 121 and is movable in the longitudinal direction 100 between an initial position (see FIG. 5) and an actuated position (see FIG. 6) The actuator unit 22 is disposed in the hole unit 111 and is movable between an upper non-pressed position, where the actuator unit 22 protrudes from a top surface of the top plate 11 (see FIG. 5), and a lower pressed position, where the actuator unit 22 is pressed downward and drives movement of the follower unit 21 from the initial position to the actuated position (see FIG. 6). In this embodiment, the follower unit 21 includes a plurality of follower components 2100 received respectively in the guide grooves 1211, and the actuator unit 22 includes a plurality of actuator components 2200 disposed respectively in the holes 1111. Each of the follower components 2100 is provided with a ramp 211 (see FIG. 3), and each of the actuator components 2200 is formed with a projection 223 (see FIG. 4) that abuts against and cooperates with the ramp 211 of a corresponding one of the follower components 2100 to result in movement of the corresponding one of the follower components 2100 to the actuated position in response to downward movement of the actuator components 2200 caused by weight of a vehicle 9 passing over the securing device 1 (see FIG. 1). To be more specific, each of the follower components 2100 is configured as a rectangular cuboid which has a top surface formed with at least one indentation 210 defined by a corresponding ramp 211, and the projection 223 of each of the actuator components 2200 is formed with at least one inclined surface 224 that contacts slidingly a respective ramp 211 of the corresponding one of the follower components 2200. In this embodiment, each of the actuator components 2200 further defines a slide space 220 to movably accommodate the corresponding one of the follower components 2100. The slide space 220 of each of the actuator components 2200 is defined by a top portion 221 and a surrounding portion 222 of each of the actuator components 2200.

In this embodiment, the surrounding portion 222 of each of the actuator components 2200 includes a pair of lateral walls 225 each of which extends in the longitudinal direction 100 and is formed with a pair of slide slots 226 that extend in a top-bottom direction through the lateral walls 225. The top plate 1 has a bottom surface formed with a plurality of pin-receiving grooves 112, each of which is registered with one of the slide slots 226 in a corresponding one of the actuator components 2200. The actuating device 2 further includes a plurality of pins 23, each of which is received in a respective one of the pin-receiving grooves 112, extends into one of the slide slots 226 in a respective one of the actuator components 2200, and limits the respective one of the actuator components 2200 to move in the top-bottom direction.

The pressure-to-rotation converter 10 may further include a biasing unit 24 for providing a biasing force to bias the follower unit 21 to the initial position. In this embodiment, the bottom plate 12 of the securing device 1 is further formed with a plurality of spring-receiving grooves 122 each of which is in spatial communication with a corresponding one of the guide grooves 121, and the biasing unit 24 includes a plurality of compression springs 241 each of which is received in a respective one of the spring-receiving grooves 122 and abuts against a corresponding one of the follower components 2100 for providing the biasing force to bias the corresponding one of the follower components 2100 to the initial position. It should be noted that, while this invention is exemplified using the compression springs 241, other forms of the biasing unit 24 may be employed in other embodiments of this invention.

Figure 7:
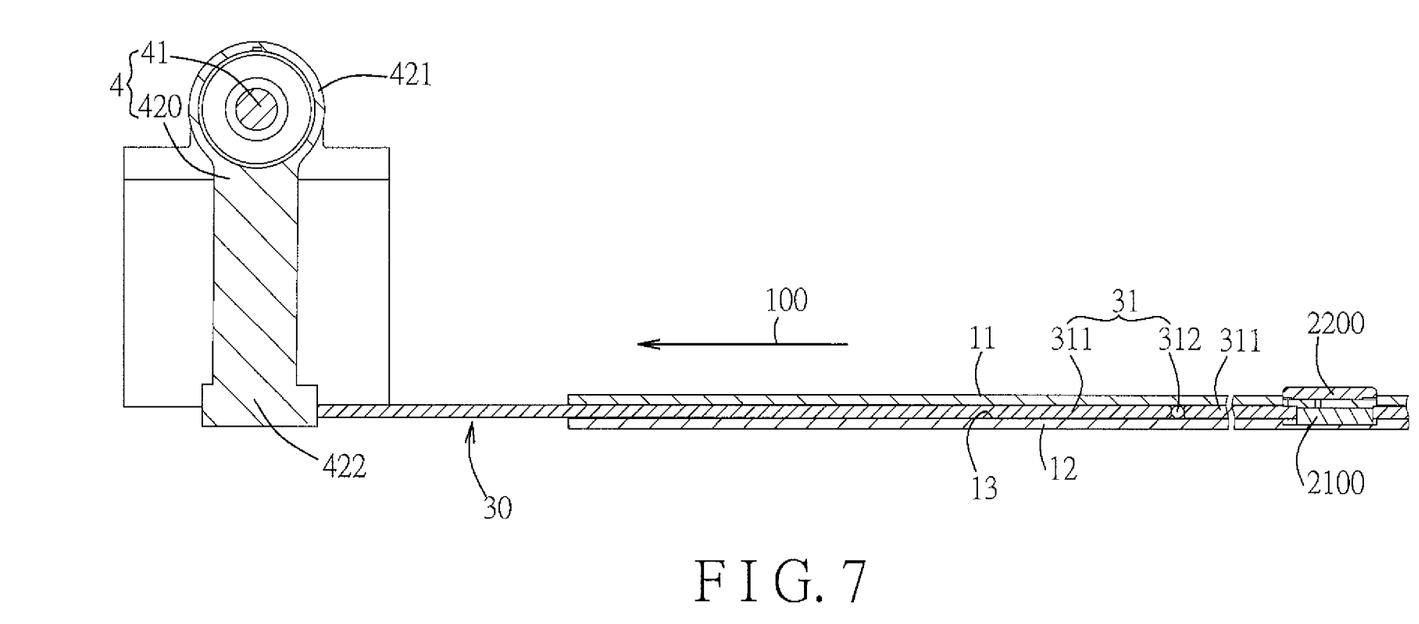
FIG. 7 is a fragmentary sectional view showing a drive device, a transmission device, and the actuating device when the actuator component is in the upper non-pressed position.
Figure 8:
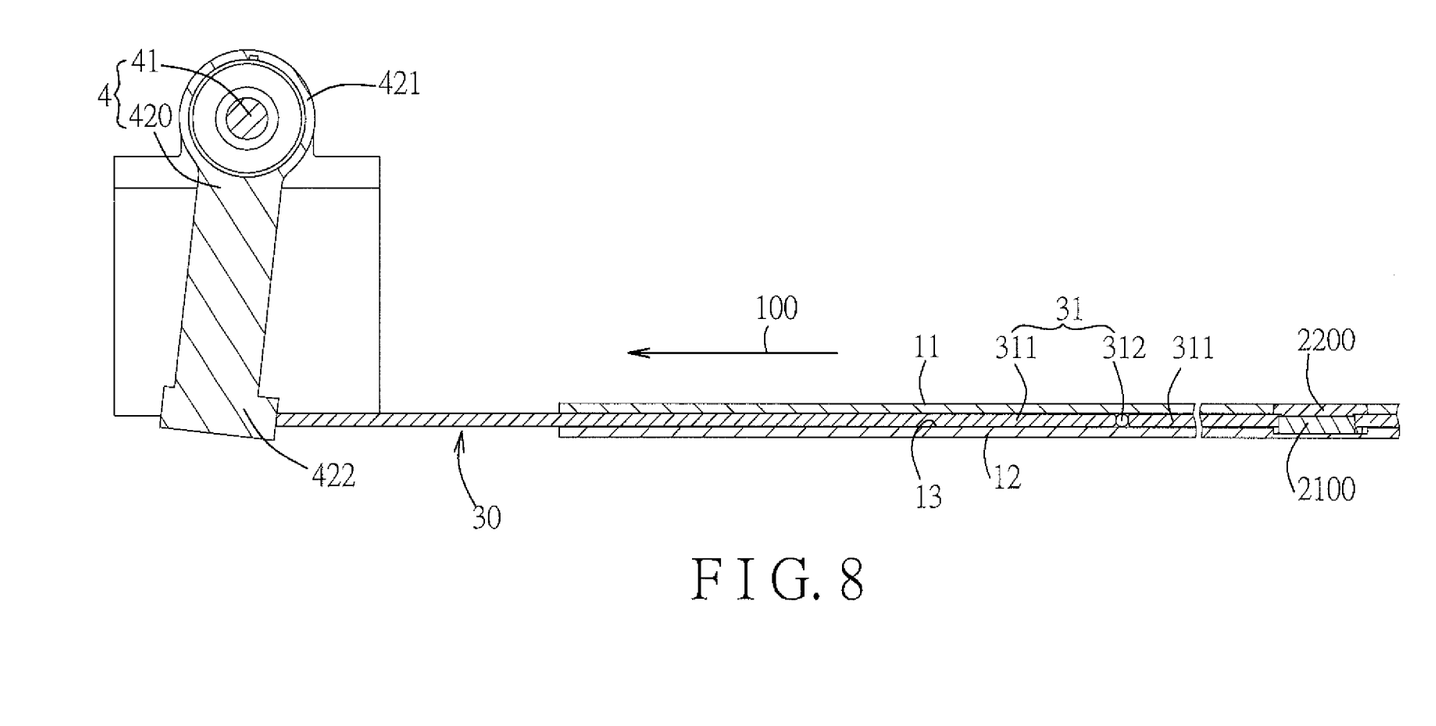
FIG. 8 is a fragmentary sectional view showing the drive device, the transmission device, and the actuating device when the actuator component is in the lower pressed position.

As shown in FIGS. 3, and 7 to 9, the transmission device 3 is received in the slide groove unit 13 and has a force-transmitting end portion 30 that extends outwardly of the securing device 1 (see FIG. 7). The transmission device 3 is driven by the follower unit 21 to move along the slide groove unit 13 to a driving state (see FIG. 8), where the force-transmitting end portion 30 is further extended outward of the securing device 1, when the follower unit 21 moves from the initial position to the actuated position. In this embodiment, the transmission device 3 includes a plurality of rod segments 31. A portion of the rod segments 31 extend from the follower components 2100 that are proximate to the second end of the securing device 1 and serve as the force-transmitting end portion 30 that extends outwardly of the second end of the securing device 1. Another portion of the rod segments 31 extend between adjacent ones of the follower components 2100.

Figure 9:
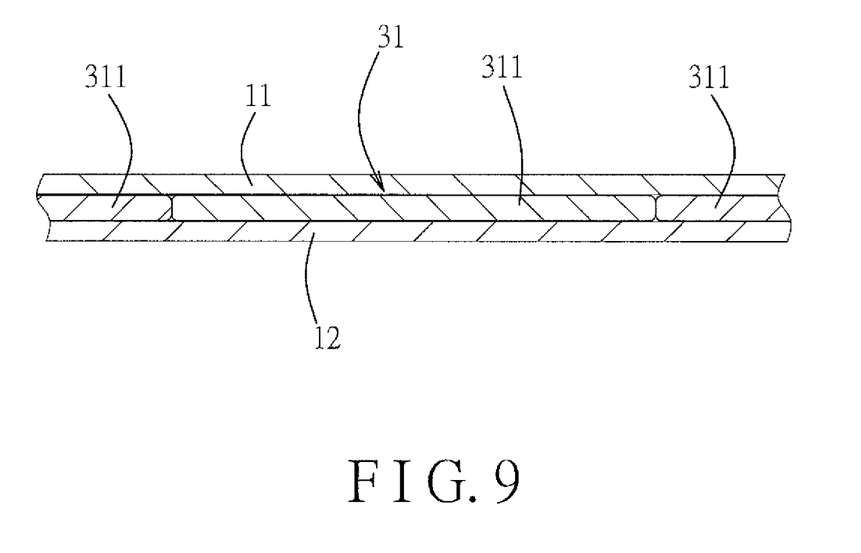
FIG. 9 is a fragmentary sectional view showing a rod segment of the transmission device that includes a plurality of spaced-apart rod sections arranged in an end-to-end contact manner.

It is noted that a ground surface for disposing the securing device 1 of the pressure-to-rotation converter 10 may not be even and thereby cause the slide groove unit 13 of the securing device 1 to deform, which in turn may affect smooth movement of the rod segments 31. Therefore, the rod segment 31 may include a pair of rod sections 311 and a bead 312 disposed between adjacent ends of the rod sections 311. By such configuration, the rod segments 31 may move smoothly along the slide groove unit 13. As shown in FIG. 9, in a variation of the preferred embodiment, the rod segment 31 may only include a plurality of separate rod sections 311 arranged in an end-to-end contact manner without including the bead 312.

The drive device 4 is disposed outwardly of the securing device 1 and includes a rotary drive shaft 41 and a swing unit 42. The swing unit 42 has a first end portion 421 coupled to the rotary drive shaft 31 via an unidirectional bearing unit, and a second end portion 422 driven by the force-transmitting end portion 30 of the transmission device 3 to urge the swing unit 42 to swing and thereby rotate the rotary drive shaft 41 in a rotating direction when the transmission device 3 is driven by the follower unit 21 to the driving state. In this embodiment, the swing unit 42 includes a plurality of swing components 420 driven by the portion of the rod segments 31 which serve as the force-transmitting end portion 30 of the transmission device 3.

Preferably, the pressure-to-rotation converter 10 further includes a ramp member 8 disposed at one side of the securing device 1 (three ramp members 8 are implemented in this embodiment), so that when the vehicle 9 moves over the securing device 1 via the ramp member 8, vibration of the vehicle 9 can be reduced.

The speed-increasing gear set 5 is coupled to the rotary drive shaft 41 for transmitting the rotation of the rotary drive shaft 41 in a higher rotation speed. The electric generator 6 is coupled to the rotary drive shaft 41 of the drive device 4 via the speed-increasing gear set 5 and is operable to convert rotation of the rotary drive shaft 41 into electricity.

The electricity storage device 7 is electrically coupled to the electric generator 6 and is operable for storing electricity generated by the electric generator 6.

When the actuator components 2200 are pressed downward by the vehicle 9 to the lower pressed position and drive the respective follower components 2100 to move from the initial position to the actuated position, the rod segments 31 of the transmission device 3 are driven to move along the slide grooves 131 to the driving state and to urge the swing unit 42 to swing, so as to rotate the rotary drive shaft 41. The rotation of the rotary drive shaft 41 is transmitted to the electric generator 6 via the speed-increasing gear set 5 and converted into electricity that may be provided to an electronic device (not shown) or stored in the electricity storage device 7.

Once the actuator components 2200 are free from being pressed by the vehicle 9, the biasing force provided by the biasing unit 24 and the weight of the swing unit 42 cause the follower components 2100 to move back to the initial position, drive the actuator components 2200 to move back to the upper non-pressed position, and restore the transmission device 3 from the driving state.

The pressure-to-rotation converter 1 of the present invention is capable of converting the downward movement of the actuator unit 21 into the horizontal movement of the follower unit 22 and the transmission device 3, such that the thickness of the securing device 1 may be effectively reduced. Accordingly, the securing device 1 can be directly mounted on the road surface due to the reduced thickness thereof. Moreover, by arranging the actuator components 2200 in multiple rows, when the vehicle 9 sequentially presses each row of the actuator components 2200, the driving force of the swing component 420 respective to each row of the actuator components 2200 can be accumulated, so as to enhance the rotation of the rotary drive shaft 42 and increase efficiency of the pressure-to-rotation converter 10. Furthermore, the rod segments 31 of the transmission device 3 received in each of the slide grooves 131 are driven by a respective row of the actuator components 2200 via the corresponding row of the follower components 2100, and thereby reduce the displacement requirement of each of the actuator components 2200 to drive the drive device 4, so that vibration of the vehicle 9 caused by the actuator components 2200 can be reduced when the vehicle 9 moves over the securing device 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A pressure-to-rotation converter comprising:
   a securing device including a bottom plate having a top surface that is formed with a guide groove unit, and a top plate disposed on top of said bottom plate and formed with a hole unit that is registered with said guide groove unit, said top plate and said bottom plate cooperatively defining a slide groove unit which extends in a longitudinal direction and which is in spatial communication with said guide groove unit;
   an actuating device including
      a follower unit that is received in said guide groove unit and that is movable in the longitudinal direction between an initial position and an actuated position, and
      an actuator unit that is disposed in said hole unit and that is movable between an upper non-pressed position, where said actuator unit protrudes from a top surface of said top plate, and a lower pressed position, where said actuator unit is pressed downward and drives movement of said follower unit from the initial position to the actuated position;
   a transmission device received in said slide groove unit and having a force-transmitting end portion that extends outwardly of said securing device, said transmission device being driven by said follower unit to move along said slide groove unit to a driving state, where said force-transmitting end portion is further extended outward of said securing device, when said follower unit moves from the initial position to the actuated position; and
   a drive device disposed outwardly of said securing device and including a rotary drive shaft, and a swing unit having a first end portion coupled to said rotary drive shaft via a unidirectional bearing unit, and a second end portion driven by said force-transmitting end portion of said transmission device to urge said swing unit to swing and thereby rotate said rotary drive shaft in a rotating direction when said transmission device is driven by said follower unit to the driving state.

2. The pressure-to-rotation converter as claimed in claim 1, wherein:
   said guide groove unit includes a plurality of spaced apart guide grooves arranged in the longitudinal direction;
   said hole unit includes a plurality of holes registered with said guide grooves, respectively;
   said follower unit includes a plurality of follower components received in said guide grooves, respectively;
   said actuator unit includes a plurality of actuator components disposed in said holes, respectively; and
   said transmission device includes a plurality of rod segments, a portion of said rod segments extending from another one of said follower components that is proximate to one end of said securing device and serving as said force-transmitting end portion that extends outwardly of said one end of said securing device, another portion of said rod segments extending between adjacent ones of said follower components.

3. The pressure-to-rotation converter as claimed in claim 2, wherein said guide grooves are arranged in a two-dimensional array, and said swing unit includes a plurality of swing components driven by said portion of said rod segments.

4. The pressure-to-rotation converter as claimed in claim 2, wherein at least one of said rod segments includes a pair of rod sections and a bead disposed between adjacent ends of said rod sections.

5. The pressure-to-rotation converter as claimed in claim 2, wherein at least one of said rod segments includes a plurality of separate rod sections arranged in an end-to-end contact manner.

6. The pressure-to-rotation converter as claimed in claim 2, wherein each of said follower components is provided with a ramp, and each of said actuator components is formed with a projection that abuts against and cooperates with said ramp of a corresponding one of said follower components to result in movement of the corresponding one of said follower components to the actuated position in response to downward movement of said actuator component.

7. The pressure-to-rotation converter as claimed in claim 6, wherein each of said actuator components defines a slide space to movably accommodate the corresponding one of said follower components.

8. The pressure-to-rotation converter as claimed in claims 6, wherein:

each of said actuator components includes a lateral wall that extends in the longitudinal direction, and that is formed with a slide slot that extends in a top-bottom direction through said lateral wall;

said top plate has a bottom surface formed with a plurality of pin-receiving grooves, each of which is registered with said slide slot in a respective one of said actuator components; and said actuating device further includes a plurality of pins, each received in a respective one of said pin-receiving grooves and extending into said slide slot in a respective one of said actuator components.

9. The pressure-to-rotation converter as claimed in claim 6, wherein said projection is formed with an inclined surface that contacts slidingly said ramp.

10. The pressure-to-rotation converter as claimed in claim 1, wherein said follower unit is provided with a ramp, and said actuator unit is formed with a projection that abuts against and cooperates with said ramp to result in movement of said follower unit to the actuated position in response to downward movement of said actuator unit.

11. The pressure-to-rotation converter as claimed in claim 1, further comprising a biasing unit for providing a biasing force to bias said follower unit to the initial position.

12. The pressure-to-rotation converter as claimed in claim 1, further comprising a ramp member disposed at one side of said securing device.

13. A pressure-to-electric converting system, comprising:
a pressure-to-rotation converter as claimed in claim and
an electric generator coupled to said rotary drive shaft of said drive device and operable to convert rotation of said rotary drive shaft into electricity.

14. The pressure-to-electric converting system as claimed in claim 13, further comprising a speed-increasing gear set that couples said rotary drive shaft to said electric generator.

* * * * *